United States Patent Office
3,130,208
Patented Apr. 21, 1964

3,130,208
ANTHRAQUINONE DYES
Hermann Weissauer, Werner Rohland, and Dieter Ludsteck, Ludwigshafen (Rhine), Germany, assignors to Badische Anilin- & Soda-Fabrik Aktiengesellschaft, Ludwigshafen (Rhine), Germany
No Drawing. Filed Jan. 10, 1961, Ser. No. 81,698
Claims priority, application Germany Jan. 14, 1960
3 Claims. (Cl. 260—374)

This invention relates to new anthraquinone dyes, a process for their production and their use for dyeing and printing textile materials of natural, synthetic and semi-synthetic substances.

The term "textile materials" as used in this specification is intended to include fibers, flock, threads, woven and non-woven textiles. The term "natural substances" includes cellulose and natural polyamides, such as cotton, silk and wool; the term "synthetic materials" includes linear synthetic polyurethanes and polyamides, such as nylon 6, nylon 66, nylon 11 and linear synthetic polyesters, such as polyethylene terephthalate; and the term "semisynthetic substances" includes regenerated cellulose, such as rayon and rayon staple, esterified or etherified cellulose, such as cellulose 2½-acetate and cellulose tri-acetate.

It is the object of this invention to provide new dyes which can be used for dyeing the said textile materials, especially textile materials of cellulose, wool, synthetic linear polyamides and synthetic linear polyesters, particularly with the coemployment of basic-reacting compounds, brilliant shades, usually blue to green, of excellent light, wet and rubbing fastness. Details regarding the conditions to be used for dyeing and printing and as to the term "basic-reacting compounds" will be given later in this specification.

The new dyes of this invention have the general formula:

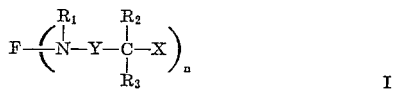

in which F denotes the radical of an anthraquinone dye, $R_1$, $R_2$ and $R_3$ each represents a hydrogen atom or an alkyl, cycloalkyl, aralkyl and/or aryl group, X denotes a halogen atom, a hydroxy group or an esterified hydroxy group in which the acid radical is derived from a polybasic mineral acid or an at least mono-basic organic derivative thereof, or a quaternary ammonium radical, tertiary sulfonium radical or isothiuronium radical, and Y denotes one of the groups of the general formulae:

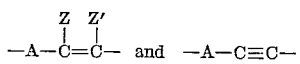

in which A stands for an alkylene or arylene radical, Z and Z′ for a hydrogen or halogen atom or an alkyl group and n stands for a whole number, especially 1 or 2. The radical represented by F may be that of a simple anthraquinone dye, i.e., a dye in which the anthraquinone system is not linked by way of a carbon-carbon bond to other cyclic systems or fused to such a system. F may also represent radicals of complex anthraquinone dyes, i.e., dyes in which the anthraquinone system is linked by way of one or more carbon-carbon bonds to other cyclic systems or fused to such systems as in the case of anthrapyrimidine, benzanthrone, perylene, benzacridone, pyranthrone, violanthrone, isoviolanthrone and pyrenequinone dyes. The radical F may also contain water-solubilizing groups, for example sulfonic acid groups or carboxylic acid groups; by these groups, which may be present one or more times in the radical, the dyes are rendered water-soluble or at least their water-solubility is improved.

The water-soluble dyes of this invention are preferred for use in dyeing cellulose materials or wool, while the new dyes which are scarcely soluble in water are preferred for use in dyeing synthetic linear polyamides, polyurethanes and polyesters. There are however exceptions to this rule.

Of the new dyes of Formula I, those are preferred which are derived from simple anthraquinones.

The new dyes of this invention are obtained by reacting anthraquinone dyes or intermediates suitable for the preparation of anthraquinone dyes, which contain carboxylic acid halide groups, carboxylic acid anhydride groups, carboxylic acid imide groups, sulfonic acid halide groups, halogenalkyl groups and/or imide halide groups, with amines of the general formula:

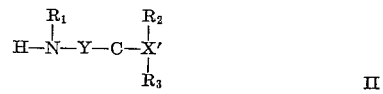

or water-soluble salts of these amines, if desired reacting the products thus obtained with substitution of the radical X′ with tertiary amines or with thioureas or with mercaptans and then with alkylating agents and, in the case of the intermediates, converting the reaction products into anthraquinone dyes. In the Formula II, Y, $R_1$, $R_2$ and $R_3$ have the meanings given above and X′ has the meaning given above with the exception of the quaternary ammonium radical, tertiary sulfonium radical and isothiouronium radical.

Examples of suitable polybasic mineral acids or their organic derivatives are sulfuric acid, phosphoric acid, alkylsulfonic acids, arylsulfonic acids, alkylphosphonic acids and arylphosphonic acids.

The reaction of the said amines with the anthraquinone dyes or intermediates containing carboxylic acid halide groups, carboxylic acid anhydride groups, carboxylic acid imide groups, sulfonic acid halide groups, halogenalkyl groups and/or imide halide groups is carried out, for example, in aqueous or organic liquids or in mixtures of both, advantageously in the presence of acid-binding agents, such as alkali acetates, alkali hydroxides, alkali carbonates and alkali hydrogen carbonates.

If desired the resultant anthraquinone dyes bearing a radical of the formula:

in which $R_1$, $R_2$, $R_3$, X′ and Y have the meanings given above may be converted by reaction with tertiary amines, such as trimethylamine, triethylamine, triethanolamine, dimethylaminobenzene, pyridine and quinoline or with water-soluble salts of these amines into the corresponding quaternary ammonium compounds or by reaction with thioureas, for example thiourea itself, or N,N,N′,N′-tetramethylthiourea, into the corresponding thiuronium salts or by reaction with mercaptans and subsequent alkylation of the resultant thio ethers into tertiary sulfonium compounds.

Intermediates suitable for the production of the new anthraquinone dyes include those which, in addition to the carboxylic acid halide groups, carboxylic acid anhydride groups, carboxylic acid imide groups, sulfonic acid halide group, halogenalkyl groups and/or imide halide groups, contain further groups which after the reaction of these compounds with the amines of the general Formula II permit the union of the reaction products obtained with anthraquinone dye precursors to form anthraquinone dyes. Intermediates of the said kind include the following compounds:

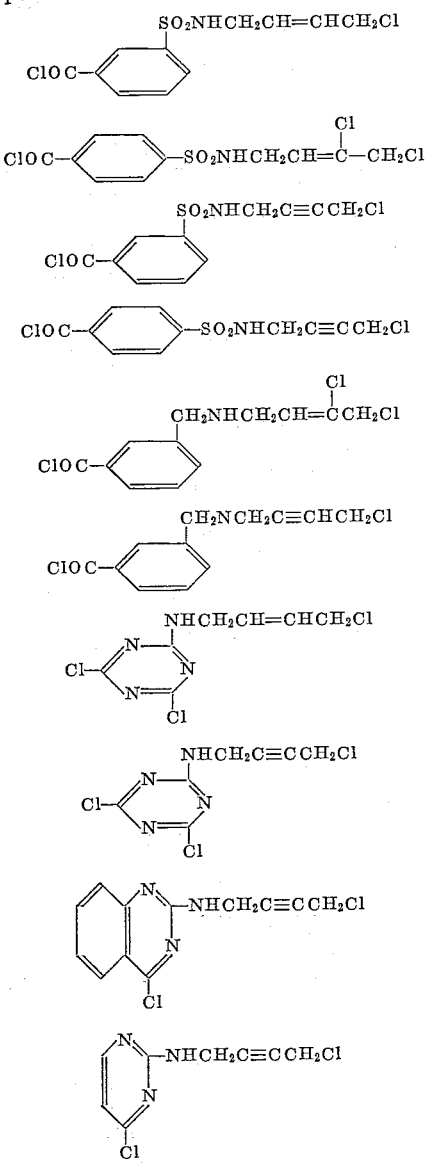

These compounds may be prepared from the corresponding sulfonic acid chloride derivatives or halogenmethyl derivatives or from cyanuric acid chloride, dichlorquinazoline or dichlorpyrimidine by reaction with the corresponding amines of the Formula II and may be reacted with anthraquinone derivatives containing primary or secondary amino groups to form anthraquinone dyes.

Anthraquinone derivatives containing amino groups include 1-aminoanthraquinone, 1,4-diaminoanthraquinone, 1,5 - diaminoanthraquinone, 1,8 - diaminoanthraquinone, 1 - amino - 4 - benzoylaminoanthraquinone, 1 - amino- 5 - benzoylaminoanthraquinone, 1 - amino - 4 - chloranthraquinone, 1-amino-4-methoxyanthraquinone, 1-amino - (2 - hydroxyethylamino) - anthraquinone, 1,4 - bis - (2 - hydroxyethylamino) - anthraquinone, 1,4 - bis - (2-sulfatoethylamino) - anthraquinone, 1 - amino - 4 - methylaminoanthraquinone, 1 - amino - 4 - (4 - aminophenyl-amino) - anthraquinone, 1,4 - diaminoanthraquinone-2- sulfonic acid, 1,4-diaminoanthraquinone-2,5- and -2,6- disulfonic acids, 1,5 - diaminoanthraquinone - 2 - sulfonic acid, the unilateral reaction products of 1-amino-4-bromanthraquinone - 2 - sulfonic acid, 1 - amino - 4 - broman- thraquinone-2-carboxylic acid, 1-amino-4-bromanthra- quinone 2,5-disulfonic acid or 1-amino-4-bromanthra- quinone-2,6-disulfonic acid with aromatic amines, such as 1,3-diaminobenzene and 1,4-diaminobenzene, 1,3-di- aminobenzene-4-sulfonic acid, 1,4-diaminobenzene-2-sul- fonic acid, 4,4' - diaminodiphenylsulfide - 2,2' - disulfonic acid, 4,4'-diaminostilbene-2-2'-disulfonic acid, 4,4'-diami- nodiphenyl - 2,2' - disulfonic acid, 4,4' - diaminodiphenyl- amine, 4,4'-diaminodiphenyl-3-sulfonic acid or aliphatic diamines, such as ethylene diamine or propylene diamine. Further suitable initial dyes are obtainable for example by unilateral reaction of leuco-1,4-diaminoanthraquinone, leuco-1,4-dihydroxyanthraquinone, perylene tetracarbox- ylic acid anhydride or perylene tetracarboxylic acid imide with aliphatic or aromatic diamines, such as ethylene di- amine, propylene diamine, 1,3-diaminobenzene, 1,4-di- aminobenzene, 1,3-diaminobenzene-4-sulfonic acid, 1,4-di- aminobenzene-2-sulfonic acid, 4,4'-diaminobiphenyl and 4,4'-diaminobiphenyl-2,2'-disulfonic acid.

Further intermediate products which bear radicals of the Formula II and which are suitable for the production of the new dyes include 1-aminobenzene-3-sulfonic acid - (3,4 - dichlorbuten - (2 - ylamide), 1 - aminoben- zene - 4 - sulfonic acid - (3,4 - dichlorbuten - (2) - yl- amide), 1 - aminobenzene - 4 - sulfonic acid - (4 - chlor- buten-(2)-ylamide) and 1-aminobenzene-4-sulfonic acid- (4-chlorbutin-(2)-ylamide) or the halogenbutenylamides and halogenbutinylamides of 1-aminobenzene-4-carbox- ylic acid, 1 - amino - 3 - chlor - 4 - methylbenzene - 6 - sulfonic acid, 1-amino-2,5-dichlorbenzene-4-sulfonic acid, 1-aminobenzene-2,4-disulfonic acid, 1-aminobenzene-2,5- disulfonic acid, 1 - aminobenzene - 2,6 - disulfonic acid, 1-amino-2-methylbenzene-4,5- or -4,6-disulfonic acid. They may be united with anthraquinone derivatives which contain carboxylic acid halide groups, carboxylic acid an- hydride groups, carboxylic acid imide groups, sulfonic acid halide groups, halogenalkyl groups and/or imide halide groups to form new anthraquinone dyes.

Examples of anthraquinone derivatives with carboxylic acid halide groups, carboxylic acid anhydride groups, carboxylic acid imide groups, sulfonic acid halide groups, halogenalkyl groups and/or imide halide groups are 1- aminoanthraquinone-2-carboxylic acid chloride, 1-amino- 4 - nitroanthraquinone-2-carboxylic acid chloride, 1,9- anthrapyrimidine-2-carboxylic acid chloride, Bz1-benzan- throne-carboxylic acid chloride, 1,4-diaminoanthraqui- none-2,3-dicarboxylic acid anhydride, 1,4-diaminoan- thraquinone-2,3-dicarboxylic acid imide, perylene tetra- carboxylic acid and perylene tetracarboxylic acid imide, and 1,4-, 1,5- and 1,8-bisarylamino-, -bisarylthio- and -bisaryloxy - anthraquinones, benzanthrones, benzacri- dones, pyranthrones, violanthrones, isoviolanthrones and pyrenequinones containing sulfonic acid chloride or halo- genmethylene groups, perylene tetracarboxylic acid imides and condensation products of 1 mol of cyanuric chloride, dichlorpyrimidine, dichlorphthalazine or dichlorquina- zoline with 1 mol of an aminoanthraquinone or an ami- noanthraquinone sulfonic acid.

The anthraquinone derivatives recited in the preceding paragraph may also be directly reacted with amines of Formula II to form dyes. Examples of amines of this formula are 1-amino-4-chlorbutine-(2), 1-amino-2,3- dimethyl-4-brombutene-(2), 1-amino-4-chlorbutene-(2), 1-amino-3,4-dichlorbutene-(2) and 1-methylamino-4-eth- ylbutine-(2)-ol-(4).

The production of amines of Formula II is carried out as described in the periodical Compt. rend., volume 241 (1955), page 752 et seq. for 1-amino-4-chlorbutine-(2), namely by reaction of the corresponding halogen com- pounds with hexamethylene tetramine and subsequent treatment of the reaction product with methanolic hydrochloric acid. The manufacturing process is repeated in detail in Example 1. These amines are not very stable in the free form and it is therefore advantageous to use them in the form of their water-soluble salts, for example their hydrohalides or sulfates, for the production of the new dyes.

Of the dyes of this invention, one group is especially preferred because they can be prepared from very readily accessible initial materials and these dyes exhibit particularly valuable properties of fastness as described above. The dyes of this group have the general formula:

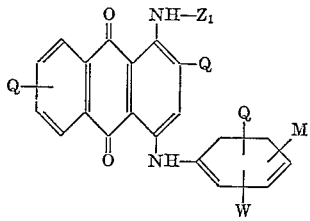

IV in which Q denotes a hydrogen atom or a sulfonic acid group, W denotes a hydrogen atom or an alkyl group, especially a methyl group, $Z_1$ represents a hydrogen atom or the radical:

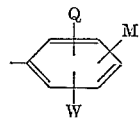

V

M denotes one of the radicals —$SO_2$—NH—T, —CO—NH—T or

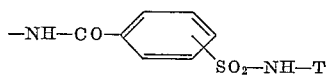

and T denotes one of the radicals:

—$CH_2$—CH=CH—$CH_2$-Hal    —$CH_2$—CH=CH—$CH_2$—$OSO_3H$
—$CH_2$—C≡C—$CH_2$-Hal    —$CH_2$—C≡C—$CH_2$—$OSO_3H$
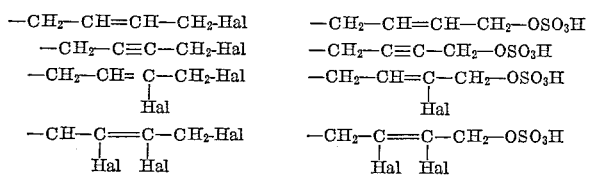

Hal stands for a halogen atom, preferably a chlorine or bromine atom.

It will be understood that the invention includes not only the new dyes in the form of their free sulfonic acids but also in the form of their salts.

The main features of the production of these especially preferred dyes of Formula IV have already been described. An anthraquinone dye of the general formula:

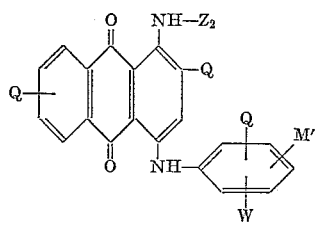

VI is reacted with an amine of the general formula:

$H_2N$—T      VII or a water-soluble salt of such an amine, especially the hydrochloride or sulfate, under the above conditions, Q, W and T having the meanings given above, $Z_2$ denoting a hydrogen atom or the radical:

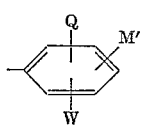

VIII and M' for one of the radicals —CO—Hal and —$SO_2$—Hal.

A modification of the process for the production of dyes of Formula IV just described comprises the reaction of an anthraquinone dye of the general formula:

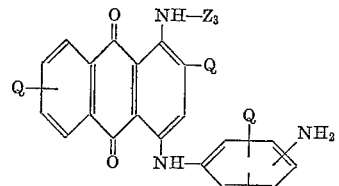

IX with a carboxylic acid halide of the general formula:

X $Z_3$ here stands for a hydrogen atom or the radical:

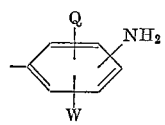

The reaction conditions in this case are also as above described.

In dyeing with the new dyes, the following procedure may be advantageously employed. For example, a textile material, such as cellulose, is padded with an aqueous solution of one or more of the new dyes. After drying, the padded material is led through an aqueous bath which contains basic-reacting compounds, such as: alkali metal hydroxides, for example sodium or potassium hydroxide; alkali metal carbonates, for example sodium or potassium carbonate; or alkali metal hydrogen carbonates, for example sodium hydrogen carbonate; or also neutral salts, such as sodium chloride and sodium sulfate. The dyes are then fixed on the material by a short steaming. Instead of steaming, a treatment with hot air at 50° to 150° C. may be used. The basic-reacting compounds or the neutral salts may also be added to the padding bath. Furthermore, textile materials of cellulose may be treated with aqueous solutions of the basic-reacting compounds, padded with the new dyes and the latter then fixed.

In printing textile material, such as cellulose, the new dyes are advantageously applied to the material to be printed together with the usual thickening agents, the said basic-reacting compounds and, if desired, the usual printing auxiliaries. The material is then dried and steamed for a short time. The textile material may also be printed with the new dyes and the usual printing auxiliaries, dried, led through a bath charged with basic-reacting compounds, again dried and steamed. Finally, the dyes may be printed together with the usual thickening agents on a fabric treated with basic-reacting compounds and the fabric then dried and steamed.

In some cases, co-employment of basic-reacting compounds can be dispensed with.

Dyeings and prints with excellent light, rubbing and wet fastness are obtained according to the said process.

The invention is illustrated by, but not limited to, the following examples in which parts and percentages are by weight.

*Example 1*

A solution of 41.6 parts of 1-amino-4-(4-methylphenylamino)-anthraquinone - 2 - sulfonic acid in 420 parts of chlorsulfonic acid is stirred for two hours at room temperature and two hours at 40° to 45° C. After cooling, the solution is poured onto a mixture of 2500 parts of ice and 1000 parts of sodium chloride, filtered off and the residue washed with cold dilute aqueous sodium chloride solution.

The pressed-off filter cake is made into a paste with 300 parts of ice-water and this paste mixed with a solution of 19.4 parts of the hydrochloride of 1-amino-3,4-dichlorbutene-(2) in 30 parts of water. The pH of the mixture is adjusted to 4 to 5 by adding dilute aqueous sodium carbonate solution, and after about two hours to 6, and the mixture is then stirred for another ten hours. The pH of the mixture is then adjusted to 7 by adding sodium carbonate, and a dye of the formula:

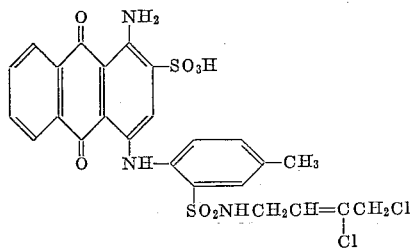

is separated in the form of its sodium salt by adding sodium chloride, filtered off and dried under reduced pressure.

10 parts of a cotton fabric are agitated for an hour at 30° to 50° C. in an aqueous solution which contains in 400 parts by volume 0.6 part of this dye, 15 parts of sodium hydroxide and 100 parts of sodium chloride. After rinsing, soaping at the boil and drying, a bright blue dyeing is obtained which has very good light, wet and rubbing fastness.

If in the method described in the second paragraph of this example, the equivalent amount of free 1-amino-3,4-dichlorbutene-(2) or the equivalent amount of the hydrochloride of 1-amino-4-chlorbutine-(2), 1-amino-4-bromobutine-(2), 1-amino-4-chlorbutene-(2) or 1 - amino - 4-bromobutene-(2), or of the sulfate of 1-aminobuten-(2)-ol-(4) sulfuric acid ester is used instead of the hydrochloride of 1-amino-3,4-dichlorbutene-(2), blue dyes with the same or very similar properties are obtained.

Another dye which dyes cotton or rayon staple reddish blue shades is obtained by using 46 parts of the anthraquinone derivative of the formula:

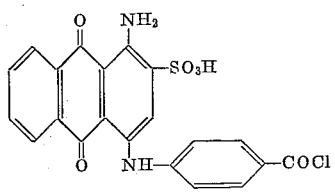

instead of the product prepared according to the method described in the first paragraph of this example. The compound of the above formula is obtained by reaction of 1-amino-4-bromanthraquinone-2 - sulfonic acid with p-aminobenzoic acid and conversion of the resultant compound into the carboxylic acid chlorine with thionyl chloride in dimethylformamide.

A typical process for the production of amines of the Formula II is as follows:

Production of the hydrochloride of 1-amino - 3,4 - dichlorbutene-(2):

200 parts of hexamethylene tetramine are stirred with 200 parts of 1,3,4-trichlorbutene-(2) and 1600 parts of chloroform for 50 hours at room temperature. The precipitate is filtered off and dried. 380 parts of 3,4-dichlorbutene-(2) - yl - hexamethylene tetrammonium chloride (melting point 175° C.) are obtained.

The dried product is dissolved in 700 parts of methanol and a powerful stream of dry hydrogen chloride is led into this solution, the solution being heated to such an extent that formaldehyde dimethyl acetal distils off at 45° C. Further hydrogen chloride gas is led into the solution and heating is continued until about 700 parts of distillate have been obtained. During distillation, methanol is added in small portions so that the volume of the distillation residue is not substantially diminished. The solution while still hot is filtered from the deposited ammonium chloride and then cooled to —10° C. The hydrochloride of 1-amino-3,4-dichlorbutene-(2) deposited is filtered off and dried. 162 parts of this compound are obtained with the melting point 126° to 128° C.

The free amine can be recovered from this hydrochloride in the usual manner.

The hydrochlorides of other aminohalogenbutenes-(2) and aminohalogenbutines-(2) can be prepared in a similar manner.

The sulfate of 1-amino-buten-(2)-ol-(4)-sulfuric acid ester is obtained by using 1-chlorbutene-(2)-ol-(4) instead of 1,3,4-trichlorbutene-(2) and then adding the hydrochloride of 1-amino-buten-(2)-ol-(4) to four times the amount of concentrated sulfuric acid and allowing the mixture to stand for some hours. The ester sulfates of 1-amino-3-chlorbutene-(2)-ol-(4) and 1-aminobutine-(2)-ol-(4) and other compounds of this kind can be prepared in a similar manner.

*Example 2*

41.8 parts of 1,4-bis-(4-methylphenylamino)-anthraquinone are heated in 420 parts of chlorsulfonic acid for two hours at 60° C. After cooling, the mixture is poured onto ice and the reaction product filtered off and washed with ice-water until neutral.

The filter cake is made into a paste with 60 parts of ice-water, a solution of 30.8 parts of the hydrochloride of 1-amino-4-chlorbutine-(2) in 60 parts of water added and the pH of the mixture adjusted to 6 in the course of some hours by adding aqueous sodium hydrogen carbonate solution. After stirring for 15 hours, the reaction product is filtered off by suction and washed with water until it has a neutral reaction. The green dye of the formula:

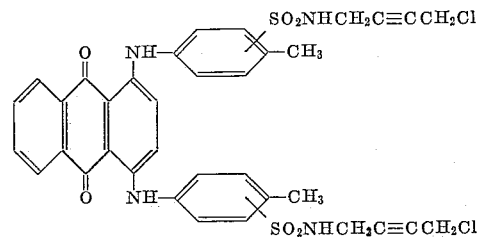

is obtained.

By using, instead of the dye prepared in the first paragraph of this example, 30 parts of 1,4-diaminoanthraquinone-2-carboxylic acid chloride, a blue dye is obtained which, like the above dye, dyes nylon 6 and nylon 66 with excellent fastness.

100 parts of nylon 6 fabric are dyed for an hour at 95° to 98° C. in a bath which contains in 3000 parts of water 0.7 part of the dye of the above formula, 3 parts of the reaction product of β-naphthalenesulfonic acid and formaldehyde and 6 parts of 30% aqueous acetic acid. Then 10 parts of anhydrous sodium carbonate are added to the dyebath and dyeing is continued for another hour at the said temperature. The fabric is then soaped for 15 minutes at 60° to 70° C. in a solution containing 2 grams of Marseilles soap per liter. A green dyeing with excellent fastness properties is obtained.

100 parts of polyethylene terephthalate fibers are dyed for an hour in a pressure vessel at 130° C. in a bath which contains in 2000 parts of water 1.2 parts of the above-mentioned dye of the formula:

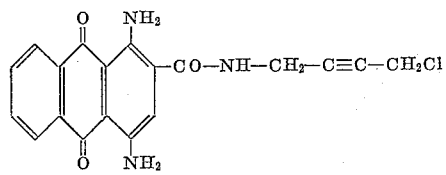

and 2 parts of the sulfonated reaction product from one mol of sperm oil alcohol and 80 mols of ethylene oxide. A blue dyeing of excellent fastness is obtained.

Example 3

37 parts of the dye mentioned last in the preceding example are mixed with 50 parts of pyridine and the mixture is allowed to stand for 15 hours. The deposited precipitate is filtered off and dried. A dye of the formula:

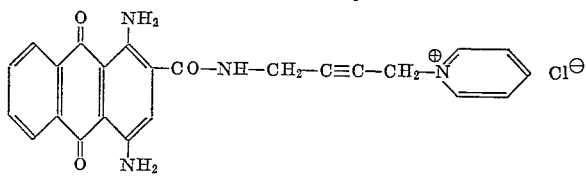

is obtained which dyes cotton, rayon staple, silk and wool blue shades.

If the dye described in the preceding example is reacted with 70 parts of thiourea or 90 parts of N,N,N',N'-tetramethylthiourea while heating at 100° C., the reaction mixture stirred with acetone, the dyes formed taken up with water and salted out with sodium chloride, blue dyes with similar properties are obtained.

Example 4

38.8 parts of the hydrochloride of 1-amino-3,4-dichlorbutene-(2) are added to a suspension of 22 parts of 1-carboxybenzene-2-sulfonic acid chloride in 80 parts of ice-water and then at 0° to 5° C. 16.8 parts of a 50% aqueous sodium hydroxide solution are allowed to flow in. The mixture is stirred for three hours at 0° to 5° C. and then for ten hours at room temperature, the reaction product is precipitated by adding dilute hydrochloric acid, filtered off, washed with water and dried under reduced pressure.

50 parts of the 1-carboxybenzene-3-sulfonic acid-(3,4-di-chlorbuten-(2)-ylamide) thus obtained, which when recrystallized from methanol has a melting point of 155° C. are converted into the acid chloride by treatment with 200 parts of thionyl chloride. The excess of thionyl chloride is removed, the residue taken up in 300 parts of acetone and this solution dripped at room temperature in the course of half an hour into a solution of 44.5 parts of 1-amino-4-(3-sulfo - 4 - aminophenylamino)-anthraquinone-2-sulfonic acid in 1000 parts of water, the pH of the mixture being kept at 4 to 5 by the simultaneous addition of dilute sodium carbonate solution. Stirring is continued for about another three hours while maintaining the said pH, and a dye of the formula:

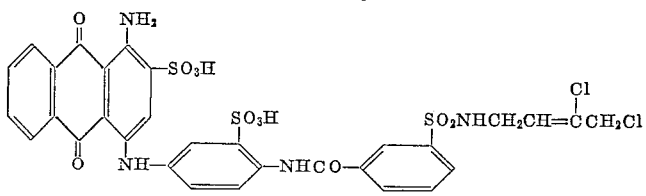

is precipitated by adding a little sodium chloride, filtered off by suction, washed neutral with dilute sodium chloride solution and dried under reduced pressure.

The dye can be fixed on cotton from an alkaline-reacting bath in blue shades fast to wet treatment.

Similar blue dyes are obtained by using 1-amino-4-(3-amino-4-sulfophenylamino)-anthraquinone-2 - sulfonic acid or 1-amino-4-(3-sulfo-4-aminophenylamino)-anthraquinone-2,5- or -2,6-disulfonic acid or 1-amino-4-(3-amino-4-sulfophenylamino)-anthraquinone-2,5- or -2,6- disulfonic acid instead of 1-amino-4-(3-sulfo-4-aminophenylamino)-anthraquinone-2-sulfonic acid.

The compounds:

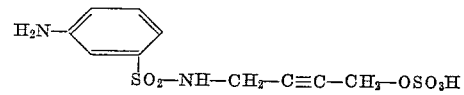

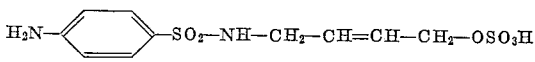

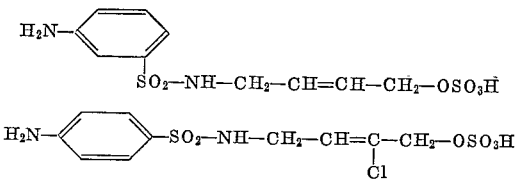

are prepared in a similar manner.

By using the compounds 1-amino-3,4-dichlorbutene, 1-amino-3,4-dibrombutene, 1-amino-4-chlorbutene, or 1-amino-4-chlorbutine instead of 1-aminobutin-(2)-ol-(4)-, the following compounds are obtained:

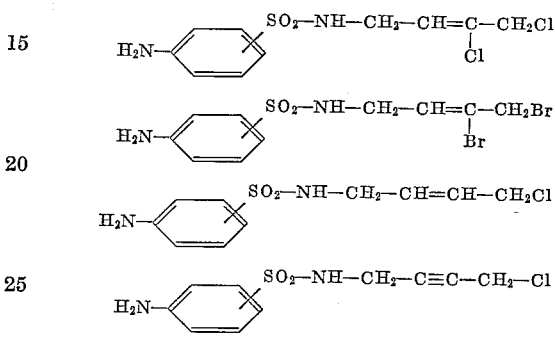

All these compounds can be reacted with the above-mentioned anthraquinone dyes containing sulfonic acid chloride or carboxylic acid chloride radicals to form valuable blue to green dyes.

If 44.5 parts of 1-amino-(3 - sulfo - 4 - aminophenylamino)-anthraquinone-2-sulfonic acid, instead of being reacted with the chloride of 1-carboxybenzene-3-sulfonic acid-(3,4-dichlorobuten-(2)-ylamide) in the way described above, are reacted with equivalent amounts of one of the following compounds 1 to 3:

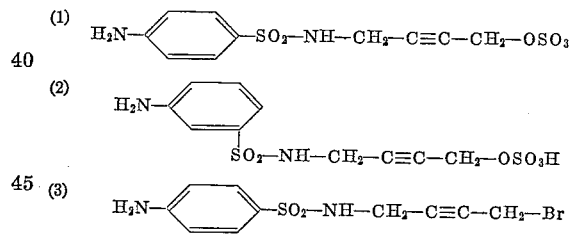

blue dyes are obtained which dye cotton, rayon or cellulose with excellent fastness.

The compounds 1 to 3 are obtained as follows:

15 parts of the hydrochloride of 1-aminobutin-(2)-ol-(4) are introduced while stirring into a solution of 56 parts of 1-acetylaminobenzene-4-sulfonic acid chloride in 100 parts by volume of tetrahydrofurane. At 0° C., 32 parts of a 50% aqueous sodium hydroxide solution are allowed to flow into the mixture and the latter is stirred for several hours at room temperature. The mixture is then introduced into about 300 parts of water, the reaction product thus being deposited. The product is heated with twice the amount of 10% aqueous hydrochloric acid and then cooled to 0° C. The compound of the formula:

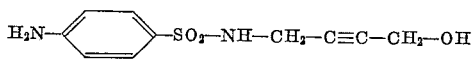

is obtained in a good yield in the form of the hydrochloride (melting point 171° to 172° C.).

2 parts of this hydrochloride are dissolved in just sufficient water to dissolve it and this solution is neutralized with dilute caustic soda solution. The deposited free amine is filtered off and dried; it has a melting point of 100° to 102° C. (yield: 1.3 parts).

The free amine is treated with 5 parts of 48% aqueous hydrobromic acid and this mixture allowed to stand for three hours. The deposited precipitate consists of the hydrobromide of the formula:

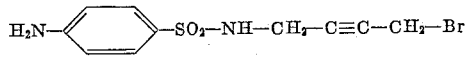

(melting point: 145° to 147° C.).

50 parts of the dry hydrochloride of the amine of the formula:

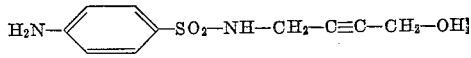

mentioned above are added at room temperature to four times the amount of concentrated sulfuric acid. When the evolution of hydrogen chloride has ceased, the mixture is allowed to stand for several hours and then poured onto three times the amount of ice. The sulfate of an amine of the formula:

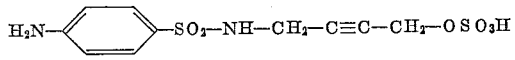

is obtained which after drying has a decomposition point of 218° C.

Example 5

22.4 parts of the monosodium salt of 1-carboxybenzene-4-sulfonic acid are heated in 70 parts of chlorsulfonic acid for an hour at 100° C. The cooled mixture is poured onto ice, the deposited 1-carboxybenzene-4-sulfonic acid chloride filtered off, washed with ice-water until a neutral reaction results to Congo red test paper and the filter cake made into a paste with 80 parts of ice-water. 38.3 parts of the hydrochloride of 1-amino-3,4-dichlorbutene-(2) are added to the paste and then gradually at 0° C. 16.8 parts of a 50% aqueous sodium hydroxide solution. The mixture is stirred for some hours at 0° to 5° C., then for 24 hours at room temperature, the 1-carboxybenzene-4-sulfonic acid (3,4-dichlorbuten-(2)-ylamide) filtered off and dried under reduced pressure. After recrystallization from aqueous methanol it melts at 128° to 130° C.

8 parts of this compound are converted into the acid chloride with thionyl chloride. The acid chloride is dissolved in 40 parts of acetone and reacted at room temperature with a solution of 7.1 parts of 1-amino-4-(3-amino - 4 - sulfophenylamino)anthraquinone - 2,6 - disulfonic acid in 180 parts of water as described in Example 4. The dye of the formula:

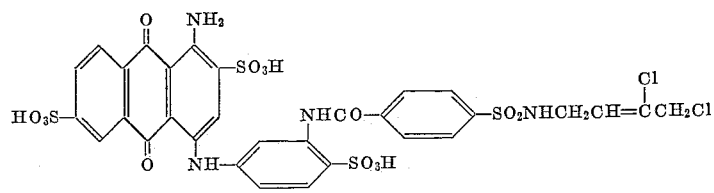

obtained dyes cotton in the presence of basic-reacting substances blue shades fast to wet treatment. By using, instead of 38.8 parts of the hydrochloride of 1-amino-3,4-dichlorbutene-(2), 30.8 parts of the hydrochloride of 1-amino-4-chlorbutine-(2), a dye of the formula:

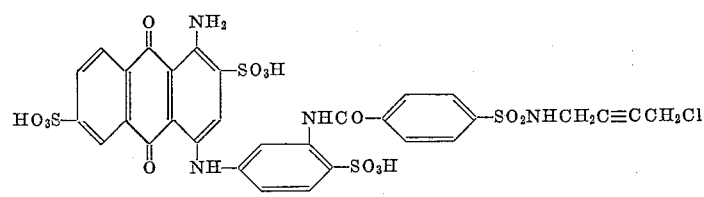

is obtained which on cotton gives blue dyeings fast to wet treatment.

We claim:

1. An anthraquinone dye of the formula:

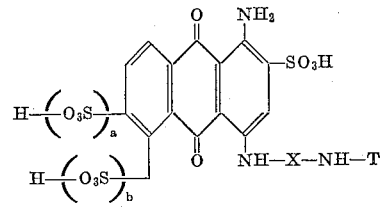

wherein: X represents a radical selected from the class consisting of

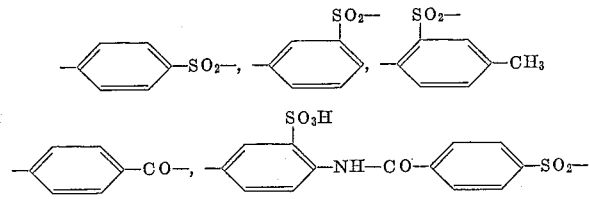

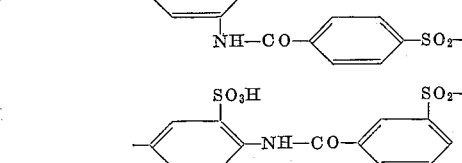

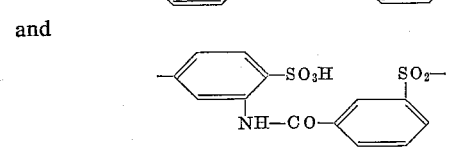

and

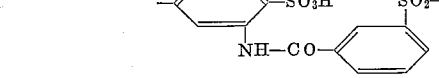

T represents a radical selected from the class consisting of

—CH₂—CH=CH—CH₂Cl
—CH₂—C≡C—CH₂Cl
—CH₂—CH=C—CH₂Cl
            |
            Cl
—CH₂—CH=CH—CH₂Br
—CH₂—C≡C—CH₂Br
—CH₂—CH=C—CH₂Br
            |
            Br
—CH₂—CH=CH—CH₂OSO₃H
—CH₂—C≡C—CH₂OSO₃H and

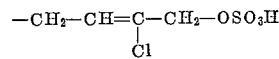

and $a$ and $b$ each represents an integer from 0 to 1, the sum of $a$ plus $b$ being an integer from 0 to 1.

2. The anthraquinone dye of the formula:
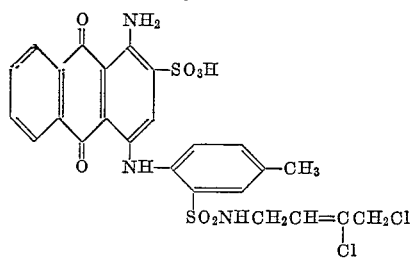
3. The anthraquinone dye of the formula:
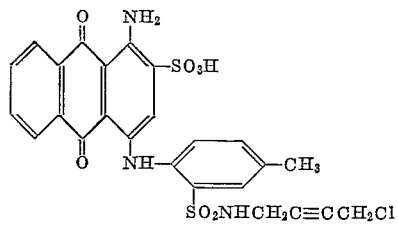
References Cited in the file of this patent
UNITED STATES PATENTS
| | | |
|---|---|---|
| 2,402,538 | Dreyfus | June 25, 1946 |
| 2,426,576 | Goulding et al. | Aug. 26, 1947 |
| 2,659,737 | Peter et al. | Nov. 17, 1953 |
FOREIGN PATENTS
| | | |
|---|---|---|
| 847,142 | Great Britain | Nov. 13, 1957 |
| 1,052,016 | Germany | Mar. 5, 1959 |
OTHER REFERENCES
Wegmann, Textil Praxis, October 1958, pp. 1056–1061.

UNITED STATES PATENT OFFICE
CERTIFICATE OF CORRECTION

Patent No. 3,130,208

April 21, 1964

Hermann Weissauer et al.

It is hereby certified that error appears in the above numbered patent requiring correction and that the said Letters Patent should read as corrected below.

Column 3, line 30, for "$CH_2NCH_2C{\equiv}CHCH_2Cl$" read -- $CH_2NHCH_2C{\equiv}CCH_2Cl$ --.

Signed and sealed this 10th day of November 1964.

(SEAL)
Attest:

ERNEST W. SWIDER
Attesting Officer

EDWARD J. BRENNER
Commissioner of Patents